United States Patent
Froeschl

(10) Patent No.: US 8,230,955 B2
(45) Date of Patent: Jul. 31, 2012

(54) METHOD OF CONTROLLING AN OVERRUN OPERATION OF A MOTOR VEHICLE, A CONTROL DEVICE FOR IMPLEMENTING THE METHOD, AND A CORRESPONDING MOTOR VEHICLE

(75) Inventor: Joachim Froeschl, Herrsching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 458 days.

(21) Appl. No.: 12/606,510

(22) Filed: Oct. 27, 2009

(65) Prior Publication Data

US 2010/0044130 A1 Feb. 25, 2010

Related U.S. Application Data

(63) Continuation of application No. PCT/EP2008/003977, filed on May 16, 2008.

(30) Foreign Application Priority Data

Jun. 6, 2007 (DE) .......................... 10 2007 026 354

(51) Int. Cl.
*B60W 10/06* (2006.01)
*B60W 20/00* (2006.01)
*B60K 6/442* (2007.10)

(52) U.S. Cl. ............. 180/65.28; 180/65.23; 180/65.265; 180/65.285

(58) Field of Classification Search ................ 180/65.21, 180/65.22, 65.225, 65.23, 65.245, 65.265, 180/65.275, 65.28, 65.285
See application file for complete search history.

(56) References Cited

U.S. PATENT DOCUMENTS

| 5,801,499 | A | | 9/1998 | Tsuzuki et al. | |
|---|---|---|---|---|---|
| 6,166,499 | A | * | 12/2000 | Kanamori et al. | ............ 318/139 |
| 7,840,337 | B2 | * | 11/2010 | Zillmer et al. | ................ 701/114 |
| 2002/0134596 | A1 | | 9/2002 | Morimoto et al. | |
| 2004/0025835 | A1 | * | 2/2004 | Sieber et al. | ................... 123/321 |

(Continued)

FOREIGN PATENT DOCUMENTS

DE 196 28 000 A1 1/1997

(Continued)

OTHER PUBLICATIONS

International Search Report dated Dec. 16, 2008 with English translation (four (4) pages).

(Continued)

*Primary Examiner* — John R Olszewski
(74) *Attorney, Agent, or Firm* — Crowell & Moring LLP

(57) ABSTRACT

A method controls an overrun operation in a motor vehicle, wherein, in the presence of predetermined switch-off conditions, an overrun switch-off of the internal-combustion engine takes place by interrupting the fuel feed, and wherein, when a predetermined restoring speed is reached or fallen below, the fuel feed is resumed. Starting from an operating state with an activated overrun switch-off, the transmission line between the output of the engine and the input of the transmission device is monitored as to whether a torque difference is occurring which is greater than or equal to a predetermined limit torque. In such a case, the internal-combustion engine is driven by an electric machine coupled with the crankshaft of the internal-combustion engine such that a rotational speed of the internal-combustion engine is adjusted to be greater than or equal to the restoring speed.

11 Claims, 2 Drawing Sheets

U.S. PATENT DOCUMENTS

| | | |
|---|---|---|
| 2004/0050598 A1 | 3/2004 | Saito et al. |
| 2007/0221421 A1* | 9/2007 | Tanishima ................ 180/65.2 |
| 2007/0227791 A1* | 10/2007 | Ueno ........................ 180/65.2 |
| 2008/0227589 A1 | 9/2008 | Zillmer et al. |
| 2009/0308673 A1* | 12/2009 | Seel ........................ 180/65.22 |

FOREIGN PATENT DOCUMENTS

| | | |
|---|---|---|
| DE | 102 12 379 A1 | 10/2002 |
| DE | 102 46 421 A1 | 9/2003 |
| DE | 10 2004 033 141 A1 | 2/2006 |
| DE | 10 2004 052 786 A1 | 5/2006 |

OTHER PUBLICATIONS

German Search Report dated Apr. 14, 2008 with English translation (nine (9) pages).

* cited by examiner

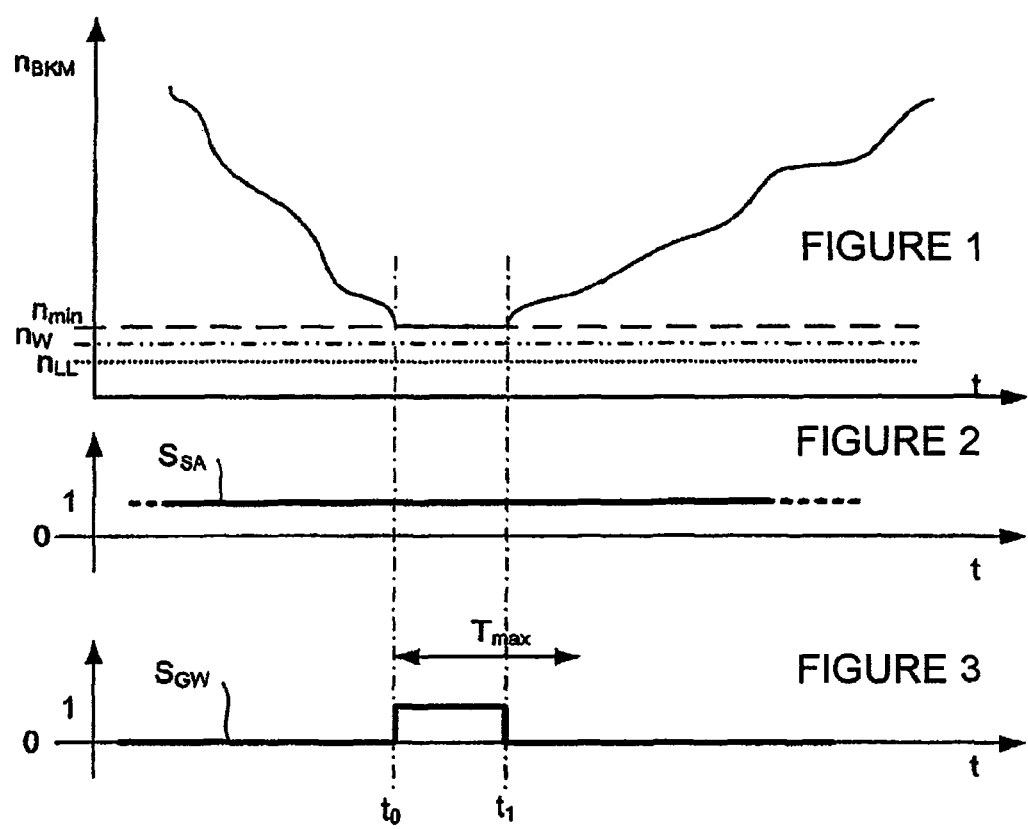

METHOD OF CONTROLLING AN OVERRUN OPERATION OF A MOTOR VEHICLE, A CONTROL DEVICE FOR IMPLEMENTING THE METHOD, AND A CORRESPONDING MOTOR VEHICLE

CROSS-REFERENCE TO RELATED APPLICATIONS

This application is a continuation of PCT International Application No. PCT/EP2008/003977, filed May 16, 2008, which claims priority under 35 U.S.C. §119 to German Patent Application No. DE 10 2007 026 354.8, filed Jun. 6, 2007, the entire disclosures of which are herein expressly incorporated by reference.

BACKGROUND AND SUMMARY OF THE INVENTION

The invention relates to a method of controlling an overrun condition of a motor vehicle, as well as a control device for implementing the method, and a corresponding motor vehicle.

When an existing overrun condition is detected, conventional controls for the overrun condition of a motor vehicle will interrupt the fuel feed. When a predetermined restoring speed of the deactivated or not fired (and motionally coupled) internal-combustion engine is reached or there is a falling below this predetermined restoring speed, then the fuel feed is resumed and the internal-combustion engine is activated or subsequently fired.

For controlling an overrun condition in the case of a hybrid vehicle, it is known from DE 10 2004 052 786 A1 to interrupt the fuel feed when an overrun condition exists, and to activate the fuel feed again when a predetermined restoring speed has been reached or there is a falling below this predetermined restoring speed. In this case, it is provided that the restoring speed is defined to be as close as possible to just above the idling speed. This is achieved in that, during hot running conditions of the internal-combustion engine, the restoring speed is set to a value of not more than 200 rpm above the idling speed of the internal-combustion engine. Such a reduction of the restoring speed can be carried out without having to expect impairment of the operation of the internal-combustion engine because, in the event of a declining idling speed, when the internal-combustion engine is started again (re-start), by way of the existing electric machine of the hybrid drive, a drive torque can be generated which assists the internal-combustion engine. This measure results in reduced fuel consumption.

It is an object of the invention to provide a method, a device for implementing the method, and a correspondingly constructed motor vehicle respectively, whereby additional fuel can be saved.

The invention is based on the recognition that, in the case of conventional systems, the internal-combustion engine is activated for brief periods of time during shifting operations, particularly during backshifting operations when driving downhill, in order to prevent a decrease of the crankshaft rotation as a result of existing friction losses of the internal-combustion engine (for example, when the transmission line is disengaged by way of a clutch).

According to the invention, starting from an operating state with activated overrun cut-off, i.e., when the internal-combustion engine is deactivated or when the internal-combustion engine's drive train is coupled while the fuel feed is deactivated, the method monitors whether the torque at the output of the motion coupled internal combustion engine has fallen or is reduced by at least a predetermined amount or a predetermined order of magnitude with respect to the torque at the transmission input. In the event that this is so, an additional torque is generated according to the invention by way of an electric machine coupled with the crankshaft of the internal-combustion engine and is transmitted to the crankshaft such that the internal-combustion engine does not reach or fall below the predetermined restoring speed.

In a preferred embodiment of the invention, either a gear shift signal indicating an imminent gear change, a clutch operating signal indication an operation of the clutch, or a converter activating signal indicating an operation of the converter device (or in each case, a corresponding correlating signal) is detected and analyzed for this purpose. Briefly stated, a signal is detected and analyzed which indicates an imminent gear change or an at least partial neutralization (caused particularly by an imminent gear change) of the power or torque coupling of the transmission line (drive train) between the internal-combustion engine output and the input of the transmission unit (and therefore a corresponding differential torque).

In a further development of the embodiment with a monitored separating clutch (for example, in the case of manual transmissions), it may be provided to monitor the operational duration of the separating clutch and, when a predetermined maximum operational duration is exceeded, to resume the fuel feed to the internal-combustion engine even in the presence of a torque difference greater than or equal to a predetermined differential or limit torque. Analogous to the above-described method, the invention also includes a control device, which is suitable for implementing the described method or to correspondingly control the internal-combustion engine and the electric machine, as well as to a motor vehicle having a corresponding control device.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 1 to 3 are graphical diagrams illustrating the temporal course of the rotational speed of the internal-combustion engine, the temporal course of the overrun switch-off signal and the temporal course of a gear shift signal, when the overrun condition is controlled according to the method of the invention.

DETAILED DESCRIPTION OF THE DRAWINGS

Figure 4:
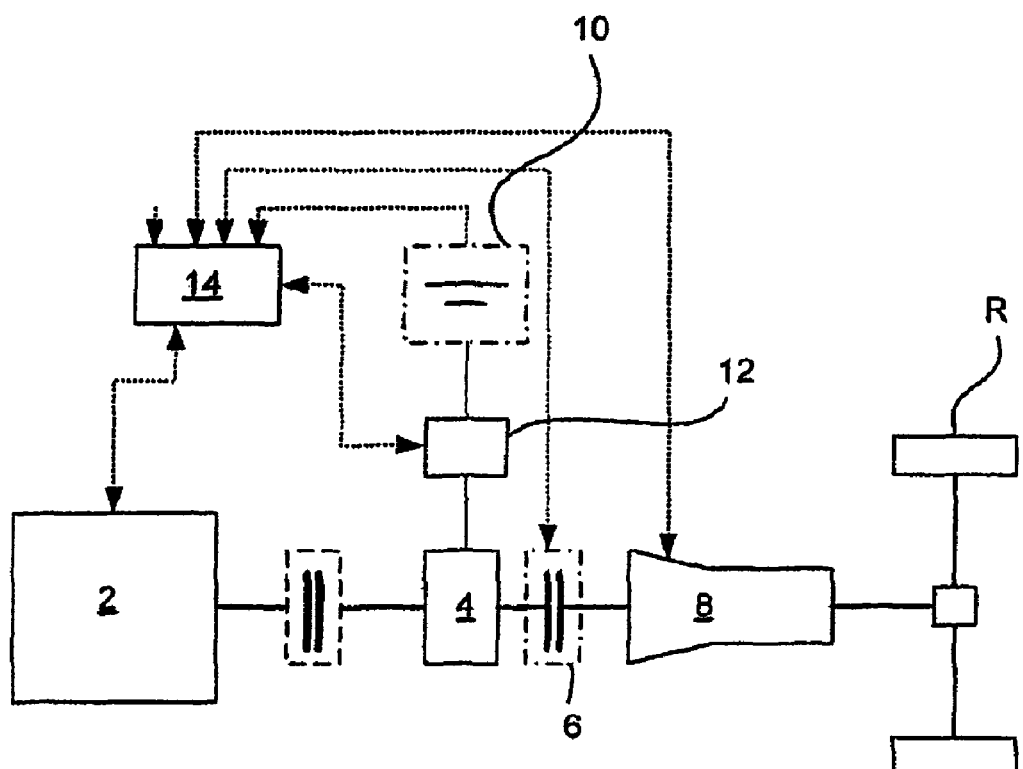
FIG. 4 is a schematic representation of a drive unit for a motor vehicle according to the invention.

FIG. 1 illustrates the temporal course of the rotational speed nBKM of an internal-combustion engine of a motor vehicle controlled according to the method of the invention in the overrun condition. Starting from an active overrun state, during which, in the presence of predetermined overrun conditions, the fuel feed to the internal-combustion engine 2 is interrupted or deactivated (and the internal-combustion engine is motionally coupled only as a result of a not separated drive train), a gear shift signal $S_{GW}$ is detected at a point in time $t_0$ at which the rotational speed $n_{BKM}$ of the internal-combustion engine has a value above a predetermined restoring speed $n_W$.

As a result of the detected gear shift signal $S_{GW}$, an electric machine 4 coupled with the crankshaft of the internal-combustion engine 2 is controlled such that, by way of the electric machine 4 (preferably for the duration of the gear change or during the time period in which the transmission line is at least partially separated with respect to the torque between the internal-combustion engine output and the transmission input), a torque is generated. This torque acts upon the crankshaft of the internal-combustion engine 2, whereby the internal-combustion engine 2 (even when the transmission line is completely separated) is held at a predetermined minimum rotational speed $n_{min}$. It is thereby achieved that, even in the case of a partially or completely separated transmission line, the internal-combustion engine 2 is held (motionally coupled) at a rotational speed $n_{min}$ greater than or equal to the predetermined restoring speed $n_W$ and an activating of the fuel feed and therefore an activating of the internal-combustion engine 2 does not take place, thus saving fuel.

FIG. 2 illustrates an overrun switch-off signal $S_{SA}$, in the case of which, at a level "one" or "high" signal level, the overrun switch-off is activated (fuel feed deactivated), and a "zero" or "low" signal level means an interruption or termination of the overrun switch-off. In the illustrated graph, as a result of the method according to the invention, the overrun switch-off is not interrupted even in the case of a gear change or a detected separation of the transmission line. The fuel consumption is additionally reduced in this manner.

FIG. 3, in addition, illustrates the temporal course of the gear shift signal $S_{GW}$, which contains information as to whether a gear change is imminent or a possibly existing separating clutch 6 is operated, or the like. In this case, the signal $S_{GW}$ may be active for the entire duration (between $t_1$ and $t_2$) of the opened separating clutch 6 and may determine the duration for which, as described above, the rotational speed of the internal-combustion engine is adjusted to active (particularly reset) by way of the electric machine 4. As a further development of the invention, in an embodiment, in which the transmission line is separated by way of a separating clutch 6 during a gear change, the operational duration of the separating clutch 6 can be monitored so that, when a predetermined maximum operational duration $T_{max}$ is reached or exceeded, the fuel feed to the internal-combustion engine is resumed (even in the presence of a torque difference greater than or equal to the predetermined limit torque or when the transmission line is separated by way of the separating clutch).

In FIG. 4, an embodiment of a transmission line for a motor vehicle according to the invention is illustrated. The transmission line includes an internal-combustion engine 2 for generating a drive torque acting upon drive wheels R. Furthermore, an electric machine 4 coupled with the internal-combustion engine 2, a separating clutch 6, as well as a transmission unit 8 are disposed in the illustrated transmission line. The electric machine 4 is preferably arranged on the drive shaft (constructed particularly as a crankshaft starter generator whose rotor is arranged directly on the drive shaft) coupled with the crankshaft of the internal-combustion engine 2. As an alternative, the electric machine 4 can also be arranged arbitrarily in a manner detached from the drive shaft and can act upon the drive shaft (or the crankshaft of the internal-combustion engine 2) by way of a belt drive, chain drive, or the like.

In addition, an energy accumulating device 10 (such as a battery and/or capacitor unit) is present, which is electrically connected with the electric machine 4 by way of an electronic coupling system 12 including an inverter unit. By way of this electronic coupling system 12, on the one hand, the electric machine 4 can be supplied with energy; on the other hand, in the event that the electric machine 4 is operated as a generator (for example, in the case of a recuperation operation), the energy accumulating unit 10 can be supplied with charge current.

By way of a control unit 14, the drive unit or the overrun operation of the internal-combustion engine 2 is controlled according to the method of the invention. For example, by way of the control unit 14 and a corresponding sensor system (not shown), the operating condition of the separating clutch 6 is monitored for this purpose. In the event that the separating clutch 6 is in an at least partially opened condition (preferably, in a completely opened/closed condition), the electric machine 4 is controlled such that, by way of the latter, a motor torque is generated and is transmitted to the crankshaft of the internal-combustion engine 2. The electric machine 4 is controlled in such a manner that the internal-combustion engine 2 rotates at an internal-combustion engine (motionally coupled) rotational speed amounting to a predetermined minimum rotational speed $n_{min}$. The predetermined minimum rotational speed $n_{min}$ is greater than or equal to the predetermined restoring speed $n_W$.

In the illustrated embodiment, the control unit 14 is constructed as a control unit which, in addition to the described functionality of the overrun switch-off, particularly includes timing gear functions. The described functionality is preferably integrated in a conventional timing gear.

The invention is not limited to the illustrated embodiment with a separating clutch 6 arranged in the transmission line. On the contrary, other embodiments with an automatic transmission and a converter device are contemplated. In a particularly preferred embodiment, the electric machine 4, in addition to the energy accumulating device 10 and the coupling unit 12, is constructed such that it can act as a sole or as an additional driving device of the transmission line. For this embodiment, an additional separating clutch TK is arranged between the internal-combustion engine 2 and the electric machine 4, which would also be controllable by way of the control unit 14.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of controlling an overrun operation in a motor vehicle equipped with an internal combustion engine and an electric machine, wherein an overrun switch-off of the internal combustion engine occurs under predetermined switch-off conditions by interrupting a fuel feed to the internal combustion engine, and wherein upon reaching or falling below a predetermined restoring speed, the fuel feed is resumed, the method comprising the acts of:

in an operating condition with the overrun switch-off active, monitoring a transmission line between an output of the internal-combustion engine and an input of a transmission device for whether a torque difference occurs that is greater than or equal to a predetermined limit torque; and when said torque difference occurs, driving the internal combustion engine by the electric machine that is coupled with a crankshaft of the internal combustion engine to adjust a rotational speed of the internal combustion engine to be greater than or equal to the restoring speed.

2. The method according to claim 1, wherein the act of monitoring a transmission line further comprises the acts of:

monitoring a separating clutch arranged between the internal combustion engine and the transmission device; and in an event that the transmission line is separated by way of the separating clutch by a predetermined extent, determining that the torque difference greater than or equal to the predetermined limit torque has been reached.

3. The method according to claim 2, further comprising the acts of:

monitoring an operational duration of the separating clutch; and when a predetermined maximum operational duration has been reached or exceeded, resuming the fuel feed to the internal combustion engine even if a torque difference greater than or equal to the predetermined limit torque is present.

4. The method according to claim 1, wherein the monitoring act further comprises the acts of:

monitoring a converter device arranged between the internal combustion engine and the transmission device; and in an event that the transmission line is separated by a predetermined extent by way of the converter device, determining that the torque difference greater than or equal to the predetermined limit value has been reached.

5. A control unit of a motor vehicle equipped with an internal combustion engine and an electric machine, the control unit comprising a computer readable medium having stored therein program code segments that:

in an operating condition with the overrun switch-off active, control a monitoring of a transmission line between an output of the internal-combustion engine and an input of a transmission device for whether a torque difference occurs that is greater than or equal to a predetermined limit torque; and when said torque difference occurs, control a driving of the internal combustion engine by the electric machine that is coupled with a crankshaft of the internal combustion engine to adjust a rotational speed of the internal combustion engine to be greater than or equal to a restoring speed.

6. A motor vehicle, comprising:

an internal combustion engine for generating a drive torque that acts upon at least one drive wheel;

a transmission device coupleable with the internal combustion engine by which different gear positions are adjustable;

means for at least temporarily separating a transmission line between an output of the internal-combustion engine and an input of the transmission device such that torques at the output of the internal combustion engine and at the input of the transmission device differ;

an electric machine for generating a motor torque acting upon a crankshaft of the internal combustion engine, the electric machine being operatively configured such that, even in an event of a complete separation of the transmission line, additional torque can be generated via the electric machine for driving the internal combustion engine; and a control unit operatively configured such that, starting from an operating condition with an activated overrun switch-off, the transmission line between the output of the internal combustion engine and the input of the transmission device is monitored as to whether a torque difference greater than or equal to a predetermined limit torque is occurring and, in such a case, the internal combustion engine is driven by way of the electric machine coupled with the crankshaft so that a rotational speed of the internal combustion engine is adjusted to be greater than a restoring speed.

7. The motor vehicle according to claim 6, wherein presence of the torque difference is determined as a function of an operating condition of a separating clutch arranged between the internal-combustion engine and the transmission device.

8. The motor vehicle according to claim 7, wherein the electric machine is constructed as a crankshaft starter generator arranged directly on a drive shaft connected with the crankshaft of the internal-combustion engine for generating an additional drive torque acting upon the at least one drive wheel.

9. The motor vehicle according to claim 6, wherein presence of the torque difference is determined as a function of an operating condition of a converter device arranged between the internal-combustion engine and the transmission device.

10. The motor vehicle according to claim 9, wherein the electric machine is constructed as a crankshaft starter generator arranged directly on a drive shaft connected with the crankshaft of the internal-combustion engine for generating an additional drive torque acting upon the at least one drive wheel.

11. The motor vehicle according to claim 6, wherein the electric machine is constructed as a crankshaft starter generator arranged directly on a drive shaft connected with the crankshaft of the internal-combustion engine for generating an additional drive torque acting upon the at least one drive wheel.

* * * * *